United States Patent [19]
Leonard

[11] 3,977,293
[45] Aug. 31, 1976

[54] LEFT HAND CHORD LOCATOR

[76] Inventor: Verna M. Leonard, 8701 N. Highway 41, Fresno, Calif. 93710

[22] Filed: July 10, 1975

[21] Appl. No.: 594,747

[52] U.S. Cl. .......... 84/474
[51] Int. Cl.[2] .......... G09B 15/02
[58] Field of Search .......... 84/471–485

[56] References Cited

UNITED STATES PATENTS

| | | | |
|---|---|---|---|
| 2,193,885 | 3/1940 | Riley | 84/471 SR |
| 2,938,421 | 5/1960 | Leonard | 84/474 X |
| 3,101,023 | 8/1963 | Weis | 84/480 X |
| 3,728,931 | 4/1973 | Leonard | 84/471 SR |
| 3,884,110 | 5/1975 | Leonard | 84/474 X |
| 3,890,875 | 6/1975 | Leonard | 84/471 SR |

*Primary Examiner*—Lawrence R. Franklin
*Attorney, Agent, or Firm*—Ralph S. Branscomb

[57] ABSTRACT

The invention is a teaching aid for familiarizing the beginning music student with left-hand chording and particularly the inversions of common chords which fit within the normal range of left hand fingering and comprises a front panel having a display of the chromatic scale including eleven numbered bass scale tones of a diatonic scale terminating in middle C, with the notes corresponding to the 11 scale tones preferably indicated thereabove on a musical staff. Three indicator strips are used alternatively to indicate from these scale tones those which are used in the tonic, dominant, and sub-dominant chords, respectively, of a particular key signature, the inversions of these chords being named on a rotatable dial, and worksheet-type writing paper being optionally provided behind said panel whereon the student can inscribe the scale tone names of any particular chord.

8 Claims, 5 Drawing Figures

LEFT HAND CHORD LOCATOR

BACKGROUND OF THE INVENTION

The present invention relates to teaching aids for musical instruments and more particularly to a device for familiarizing the student with left-hand chording.

In conventional piano instruction technique emphasis is normally placed on the playing of the melody by the right hand, and the left hand background chording, which is an anthema to most students, is rather haphazardly presented and ordinarily constitutes playing the individual notes of the chords from a staff display of notes. Learning the bass in this fashion is not only tedious but leads to rote memorization with no conceptualization or understanding of the musical principles underlying the playing.

SUMMARY OF THE INVENTION

The present invention avoids the above mentioned shortcoming of conventional instruction by providing a teaching aid which presents bass playing information in an orderly and comprehensive manner providing the student with a broad overview of bass chording principles so that he understands what he is playing. The concepts underlying this new technique are, broadly speaking, that the eleven notes of the diatonic scale below and including middle C are those ordinarily used in bass chording, and within that range three basic chord types and their inversions are played in any one key signature, any particular inversion which is used must be chosen to fall within this eleven note range.

In one embodiment, a panel is provided having the scale tones of the chromatic scale named along the lower margin and above these scale tones is a staff having 11 notes thereon corresponding to the underlying scale tones of a particular diatonic scale. These notes are consecutively numbered above, and terminate at their upper end on or near middle C.

Three strips are provided which cover the note numbers, these strips being pivoted to the panel and each having cutaway portions which expose the numbers corresponding to all the notes of a particular chord and its inversions which occur within the 11 note span. The three strips represent the tonic, dominant, and sub-dominant chords in a particular key signature, so that the user may select one strip, and see at a glance all of the possible notes which he may choose from the 11 note span to make the chord or one of its inversions.

A backing sheet joins the panel at its lower margin to provide a pocket in which worksheets are inserted so that the student may inscribe the names of the notes of the chord he has chosen on these sheets, and a rotatable dial may be pivoted to the backing sheet having an array of the principal chords and all of their inversions in a particular key signature.

In a second embodiment, the strips are pivotable directly over the row of scale tones and each one displays indicia registering with the root and inverted positions of a particular chord and is provided with fold-away tabs so that the user may expose the scale tones on the panel which represent a particular position, root, or inverted, of the indicated chord.

DETAILED DESCRIPTION OF THE PREFERRED EMBODIMENT

Figures 1, 2, 3:
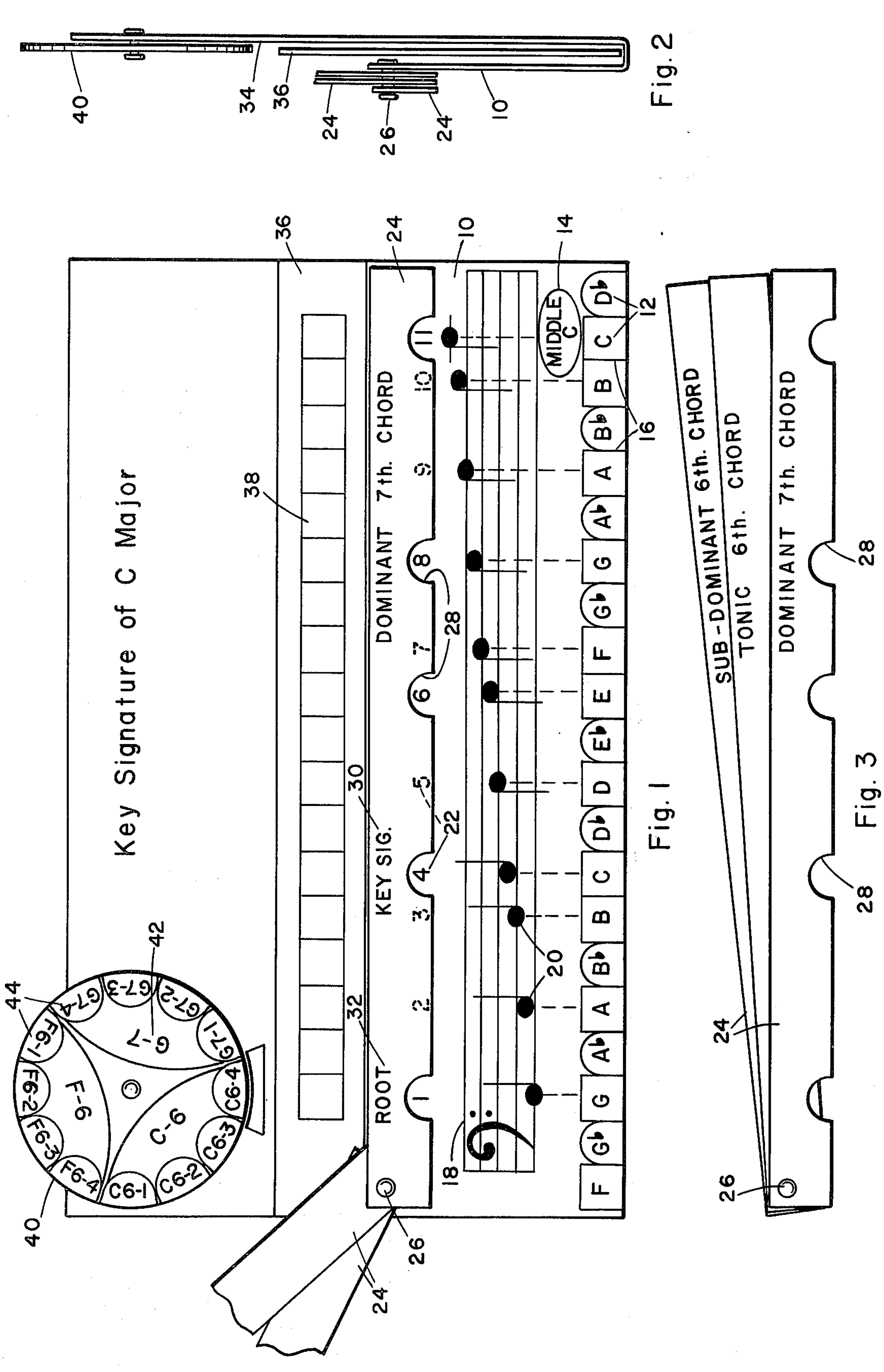
FIG. 1 is a front elevation view of the invention showing one of the strips 24 exposed, the other two strips being partially shown and pivoted out of the way.
FIG. 2 is a side view of the teaching aid as seen from the right side of FIG. 1.
FIG. 3 is a front elevation detail of the three strips pivoted together.

The teaching aid is drawn to a single key signature, the illustrated embodiment representing the key of C, so that if desired a set of 12 similar units could be provided to represent all key signatures. With initial reference to FIGS. 1–3, a front panel 10 is used, which may be of stiff paper or the like, and along the bottom of the panel is a row 12 of the scale tones of the chromatic scale, which terminate at the upper end at, or near, middle C as indicated at 14. These scale tones may be displayed to differentiate those falling within the key signature from those not in the key signature, such as by utilizing enclosing squares 16, and the spacing of the scale tones may be equal to that of a piano keyboard so that the unit may be used on a piano on or behind the corresponding keys.

Above the row 12, is a musical staff 18 and the notes 20 in the key of C are displayed on the staff above their named scale tones 12, and directly above these notes is a row of numbers 22 ordering the notes. These numbers are somewhat subject to change for the various key signatures, but normally would begin at the lowest note in the key signature ordinarily played by the left hand and end at middle C or the last note in the key signature short of middle C.

A plurality of cover strips 24 are pivoted at 26 or otherwise mounted such that an individual strip can be moved into a position covering the numbers. Each of the strips has cutaway portions 28 which reveal certain of the numbers which correspond to notes in a particular chord type. It is preferred that three of there strips be used, to represent the tonic, dominant, and sub-dominant chords of the given key signature, which are the principal chords played by the left hand. However, it is clear that the strips could represent any chord type and are not restricted to the three principal chords, and it should also be noted that the strips could be positioned over the row 12 of the scale tones and achieve the same result.

The exposed strip in the illustrations of FIGS. 1–3 represent the dominant seventh chord, which in the key of C would be G7. The cut away notches thus reveal the scale tones C, B, D, and F which occur in the 11 note interval, so that the user can arrange any combination of these scale tones which constitute the root chord or any of its inversions provided the selected combination fits within the bass play interval. For example, in the case of the G seventh chord, the root and first two inversions can be played, but not the third inversion, which will not fit within the permitted range. Further indicia are desireable on the strips to indicate the key signature as at 30 and the root tone of the particular chord as at 32.

The other strips are similar to the G7 strip as shown in FIG. 3 but are directed to the C-6 and F-6 chords, which represent the tonic, and sub-dominant chords respectively in the key of C.

The front panel 10 may be joined at its lower margin by a backing sheet 34, which could be part of a single sheet of paper folded to provide a pocket behind the panel and an upward extension. A plurality of worksheets 36, only one of which is shown, can be positioned in the pocket, these sheets each having a row of squares 38 or other writing spaces which are visible above the front panel, the purpose of these worksheets being to permit the user to inscribe the scale tone names of any chord he has composed to reinforce his learning. The numbers corresponding to the scale tones of the selected chord can be inscribed above the squares to emphasize the internal arrangement on the diatonic scale represented by the chord. The individual sheets are removed after usage and replaced with a fresh sheet.

To further clarify the student's understanding of the left hand or bass chording structure, a dial 40 is pivoted to an upper part of the backing sheet. This dial is divided into three sectors as shown, each of the three sectors being devoted to one of the three principal chord types and displaying the chord name 42 and the inversions 44. The dial thus provides at a glance a summary of all the chords that would normally be played by the left hand in the chosen key signature.

Figure 5:
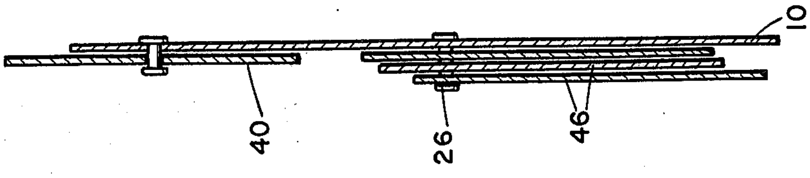
FIG. 5 is a side elevation view of the modification of FIG. 4 but shown in a slightly different position.
Figure 4:
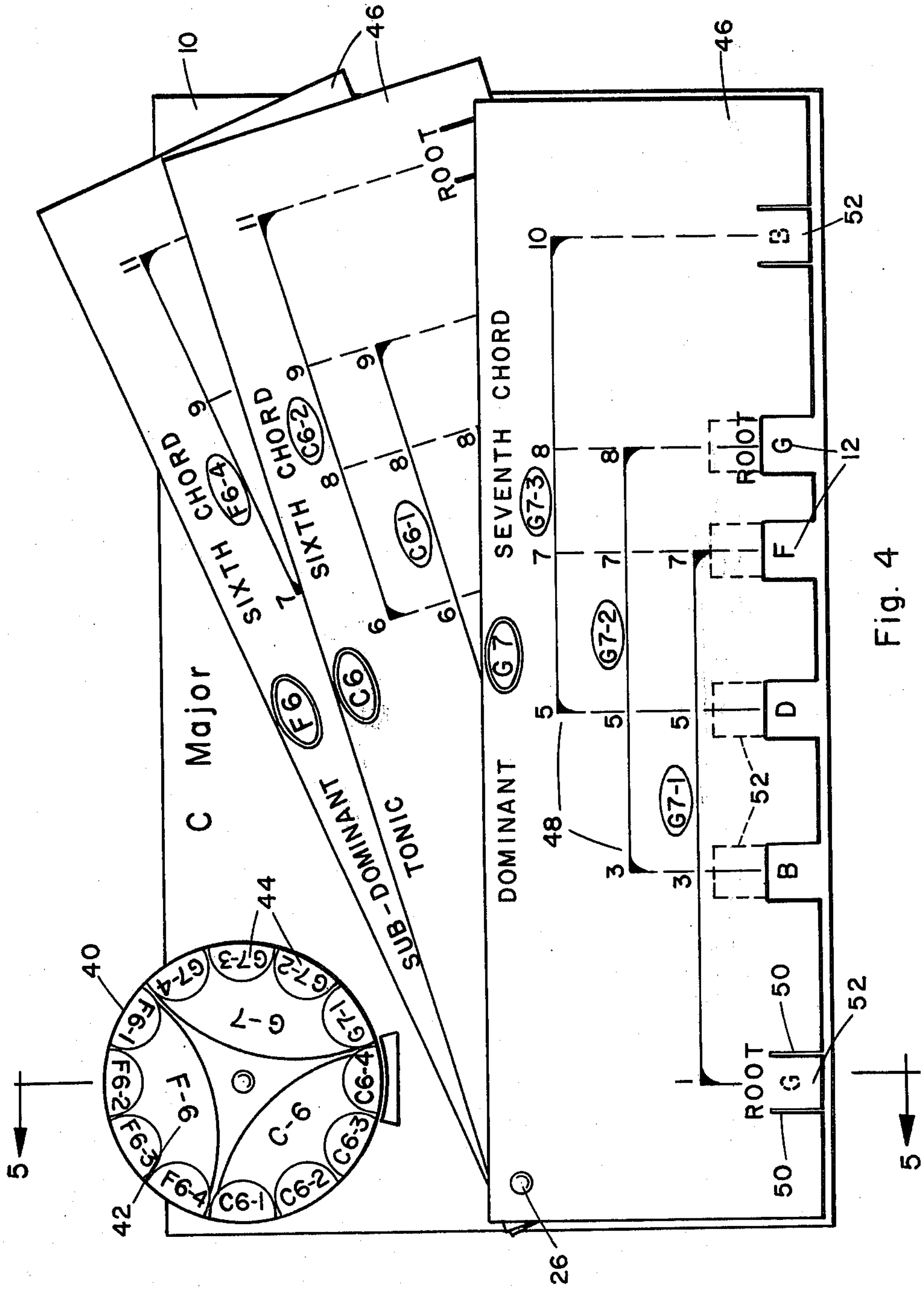
FIG. 4 is a front elevational view of a modification of the teaching aid.

Another embodiment of the invention is shown in FIGS. 4 and 5, this modification also having a front panel 10 with a row of scale tones 12 on the bottom thereof, and a dial 40 is pivoted directly to the panel. This embodiment could be provided with narrow strips similar to strips 24 so that a musical staff could be displayed on the front panel above the strips, and the worksheets 36 could be used, but for simplicity these elements are omitted and only the variant strips 46 are detailed.

Each of these strips represent a particular chord, such as G7 for the foremost strip in FIG. 4, and is provided with a display of indicia 48 indicating all possible root and inverted positions of the chord within the 11 note range of the scale tone display. This indicia registers with the appropriate scale tones as shown, and a plurality of slits 50 are provided along the bottom of each strip to define tabs 52 which can be bent rearwardly as shown in FIG. 5 to expose selected ones of the scale tones, so that the scale tones of the particular position of the chord, such as the first inversion as in the front strip in FIG. 4, can be exposed. Thus the modification of the invention permits the user to select and concentrate on one particular form of the chord rather than the scale tones of the root and all the inverted positions being displayed at once. Of course the tabs 52 can be folded back into place and others folded out of the way so that different chord forms may be selected.

A set of strips similar to strips 46 could be provided such that each one indicates the root and inverted positions of the tonic, dominant, and sub-dominant chords for a particular key signature. Thus the variations of the three principal chords could be seen at a glance, and all key signatures could be used on a single model. Other variations are made possible by combining the features of the two embodiments, such as pivoting the strips 24 to register with the scale tones 12, or providing the embodiment of FIGS. 4 and 5 with a backing sheet to mount the dial 40 and receive staff paper as in the first embodiment.

I claim:

1. A bass chord and inversion teaching aid comprising:

a. a panel having the scale tones of a certain range of the chromatic scale named in a row along the lower edge thereof;

b. a plurality of individually exposable strips mounted on said panel and each representing a particular chord type named thereon;

c. each of said strips having indicator means thereon to register with all the named scale tones in said row which comprise the tones of the chord type named on the respective strip; and d. each of said strips further including tabs foldable to selectively define openings to expose particular ones of said scale tones.

2. Structure according to claim 1 wherein the chords represented by said strips relate to a particular key signature, and including a musical staff displayed on said panel above said row and having the notes thereon of said particular key signature, said notes being aligned with the particular scale tones corresponding thereto.

3. Structure according to claim 1 and including a backing sheet joined to said panel along the lower margin thereof to define a pocket, and further including a plurality of removeable sheets disposed in said pocket, each of said sheets having a plurality of writing spaces visible above said panel, each of said writing spaces being aligned with one of said named scale tones, whereby a music student can inscribe the names of the scale tones of a particular chord inversion therein.

4. Structure according to claim 1 wherein said strips are three in number and represent the tonic, dominant, and sub-dominant chords of an identified key signature.

5. Structure according to claim 1 and including a backing sheet mounted to said panel, said backing sheet having thereon a rotatable dial displaying the names of all the chord inversions of the tonic, dominant, and sub-dominant chords in a particular key signature.

6. Structure according to claim 1 wherein the teaching aid relates to a particular key signature, the highest of said named scale tones being middle C on a piano keyboard and the range of said named scale tones including eleven consecutive notes of the diatonic scale representing said particular key signature.

7. Structure according to claim 1 wherein said strips are pivoted to said panel.

8. Structure according to claim 7 wherein each of said strips represents a particular chord type and is provided with indicia indicating the root and inverted positions of said particular chord type and registering with the scale tone of said root and inverted positions.

* * * * *